March 2, 1937.  W. ZEINDLER  2,072,239
TRUCK AND TRAILER COUPLING
Filed Jan. 20, 1936
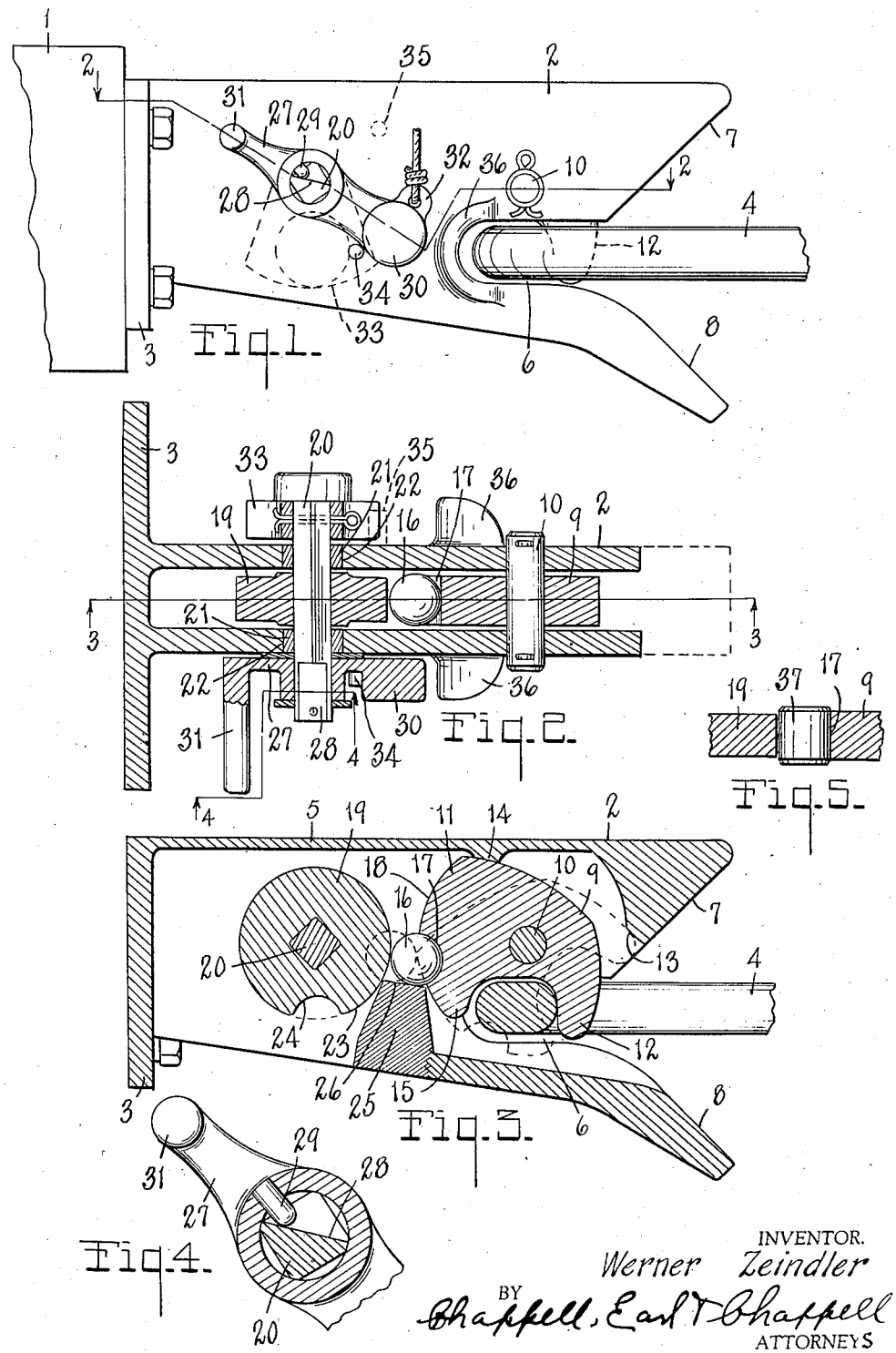
INVENTOR.
Werner Zeindler
BY Chappell, Earl & Chappell
ATTORNEYS Patented Mar. 2, 1937

2,072,239

UNITED STATES PATENT OFFICE 2,072,239

TRUCK AND TRAILER COUPLING

Werner Zeindler, Albion, Mich., assignor to Service Caster & Truck Company, Albion, Mich.

Application January 20, 1936, Serial No. 59,828

16 Claims. (Cl. 280—33.15)

The main objects of this invention are:

First, to provide a coupling for trucks and trailers such for example as warehouse, station, wharf, and like trucks which may be automatically engaged and is effectively locked in engaged position but may be easily released even when under substantial load.

Second, to provide an improved automatic coupling in which no springs are employed.

Third, to provide an improved coupling in which the parts are simple and economical to produce, and at the same time are easily assembled and very durable.

Objects relating to details and economies of the invention will appear from the description to follow. The invention is defined and pointed out in the claims.

Preferred embodiments of my invention are illustrated in the accompanying drawing, in which:

Fig. 1 is a fragmentary side elevation of my improved coupling.

Fig. 2 is a view mainly in section on a line corresponding to line 2—2 of Fig. 1.

Fig. 3 is a fragmentary vertical section on line 3—3 of Fig. 2.

Fig. 4 is an enlarged detail view in section on the broken line 4—4 of Fig. 2.

Fig. 5 is a detail section showing a modified form of locking detent.

In the embodiment of my invention illustrated in the drawing, I represents the body of a truck or tractor as the case may be and 2 a chambered coupling head formed as a casting and having an attaching flange 3 at one end. The bail-shaped coupling member 4 is suitably attached to the truck or to the vehicle to be coupled.

The coupling head 2 is preferably chambered as illustrated in Figs. 2 and 3 and has a top wall 5 closing the chamber so that it constitutes an effective housing for the parts arranged therein. The coupling head 2 has a slot or slot-like recess 6 opening at the outer end of the head, the head being provided with diverging guides 7 and 8 for guiding the coupling member 4 into the slot.

The coupling hook 9 is pivoted at 10, the coupling hook being conformed to provide a counterweight 11 which acts to swing the hook to disengaged position, as shown in Fig. 3, with the bill 12 of the hook engaging a stop 13 provided therefor. When the hook is in engaged position, as shown by full lines in Fig. 3, it engages the stop 14. The hook is provided with a tappet 15 at the rear of the bill positioned to be engaged by the coupling member 4 which acts to automatically swing the hook into engaging position. It will be noted that the bill 12 of the hook is substantially straight so that it can be readily disengaged from the bail-shaped coupling member 4 even with the parts under substantial load.

The hook is retained in its engaged position by the detent or pawl 16 which engages a recess 17 in the rear curved face 18 of the pawl. This curved face is preferably concentric with the pivot 10.

The pawl is, in the preferred embodiment, a ball and is retained in hook holding position by means of the detent keeper 19. This detent keeper 19 is carried by the pivot 20, preferably a squared pin, provided with bushings 21 engaged in suitable bearing openings 22 in the sides of the head. This detent member is preferably cylindrical but in any event it has a curved face 23 having a detent recess 24 therein adapted to receive the detent when brought into alignment with the detent.

The detent is supported on the lug-like projection 25 disposed between the pawl and the detent keeper and having a forwardly inclined face 26. The distance between the detent faces of the pawl and the keeper in the plane of the detent is substantially less than the diameter of the detent so that the detent is held in engaging position with the pawl when the hook is in engaged position, or when the recess 24 of the detent keeper is brought into position to receive the detent as shown by dotted lines in Fig. 3, the detent is, by the pressure of the hook thereon, forced into the recess 24 thereby releasing the hook.

The keeper is manually actuated to releasing position by means of the lever 27 mounted on one end of the pin 20, the lever having a lost motion connection to the pin, this being accomplished by facing off the end of the pin embraced by the hub of the lever at 28 and providing a pin 29 coacting with this faced-off portion 28—see Figs. 1 and 4.

The lever is provided with a weight 30 opposite its handle 31; also preferably provided with a loop 32 on its weighted end so that it may be operated by means of a chain or cable arranged through a suitable guide pulley.

The keeper is also counterweighted by means of the weight 33 mounted on the other end of the pin, this weight 33 acting to normally hold the keeper in the position best shown in Fig. 3. By weighting the lever 27 and providing the lost motion connection therefor to the pin, the weights 30 and 33 serve to coact with each other, preventing rhymatic vibrations or swinging of the weight 33 being set up by the jolting or jarring or traveling over rough pavements or platforms such as might conceivably swing the keeper to hook releasing position. However, by connecting one weight through the lost motion connection to the pin and connecting the other on the pin, such movement is effectively prevented.

A stop 34 is provided to coact with the lever 27 and a stop 35 to coact with the weight 33, thus limiting the stroke of the keeper. When the lever is in the position shown in Figs. 1, 2 and 3 by full lines, the detent keeper is in its locking position and when it is swung by the actuation of the lever 27 to bring the recess 24 into position to receive the detent, the detent is shifted on its support into the recess, thereby releasing the hook. This movement of the keeper may be effected either through grasping the handle 21 or by pulling on a chain or cable connected to the loop 32.

I preferably provide the housing with laterally projecting lips or flanges 36 at the rear of the slot 6, these providing effective bumpers and guides for the coupling member 4 in the event it is not presented directly to the coupling head and also forming guides for the weight members described.

In the embodiment shown in Fig. 5, the detent 37 is in the form of a roller instead of a ball. Both forms of detent have been found satisfactory.

My improved coupling is highly effective in that it may be automatically engaged and practically no effort is required to release it even when under load. The parts are simple and economical to produce and easily assembled, and at the same time are very strong and durable.

I have illustrated and described my improvements in a highly practical embodiment thereof. I have not attempted to illustrate or describe certain modifications or adaptations which I contemplate as it is believed this disclosure will enable those skilled in the art to embody or adapt my improvements as may be desired.

Having thus described my invention, what I claim as new and desire to secure by Letters Patent, is:

1. In a coupling, the combination of a chambered coupling head closed at the top to provide a housing and having an outwardly facing slot with diverging guides leading thereto, a coupling hook pivotally mounted in said head above said slot and provided with a counterbalance at its inner end acting to swing the hook to disengaged position, the hook having a tappet at the rear of its bill lying in the slot when the hook is in disengaged position so that a thrust thereon will swing the hook to engaged position, the bill of the hook being substantially vertical when in engaged position, the hook having a face with a recess therein at its inner end, a spherical detent, a support for said detent disposed at the rear of said hook and having a forwardly inclined face on which the detent rests, a pivotally mounted detent keeper at the rear of said detent support having a curved face with a recess therein adapted to receive said detent when the recess is brought into alignment therewith, the distance between said curved faces of said hook and keeper in the plane of the detent being less than the diameter of the detent, the pivot of said keeper projecting from the sides of said head, a weight on said keeper pivot acting to hold the keeper in detent locking position, and stops limiting the strokes of said keeper.

2. In a coupling, the combination of a chambered coupling head closed at the top to provide a housing and having an outwardly facing slot with diverging guides leading thereto, a coupling hook pivotally mounted in said head above said slot and provided with a counterbalance at its inner end acting to swing the hook to disengaged position, the hook having a tappet at the rear of its bill lying in the slot when the hook is in disengaged position so that a thrust thereon will swing the hook to engaged position, the bill of the hook being substantially vertical when in engaged position, the hook having a curved face with a recess therein at its inner end, a spherical detent, a support for said detent disposed at the rear of said hook and having a forwardly inclined face on which the detent rests, and a pivotally mounted detent keeper at the rear of said detent support having a curved face with a recess therein adapted to receive said detent when the recess is brought into alignment therewith, the distance between said curved faces of said hook and keeper in the plane of the detent being less than the diameter of the detent.

3. In a coupling, the combination of a coupling head having an outwardly facing slot, a coupling hook pivotally mounted above said slot and provided with a counterbalance at its inner end acting to swing the hook to disengaged position, the hook having a tappet at the rear of its bill lying in the slot when the hook is in disengaged position so that a thrust thereon will swing the hook to engaged position, the hook having a curved face with a recess therein at its inner end, a detent, a support for said detent disposed at the rear of said hook, a pivotally mounted detent keeper at the rear of said detent support having a curved face with a recess therein adapted to receive said detent when the recess is brought into alignment therewith, the distance between said curved faces of said hook and keeper in the plane of the detent being less than the diameter of the detent, the pivot of said keeper projecting from the sides of said head, a weight on said keeper pivot acting to hold the keeper in detent locking position, and stops limiting the strokes of said keeper.

4. In a coupling, the combination of a coupling head having an outwardly facing slot, a coupling hook pivotally mounted above said slot and provided with a counterbalance at its inner end acting to swing the hook to disengaged position, the hook having a tappet at the rear of its bill lying in the slot when the hook is in disengaged position so that a thrust thereon will swing the hook to engaged position, the hook having a curved face with a recess therein at its inner end, a detent, a support for said detent disposed at the rear of said hook, and a pivotally mounted detent keeper at the rear of said detent support having a curved face with a recess therein adapted to receive said detent when the recess is brought into alignment therewith, the distance between said curved faces of said hook and keeper in the plane of the detent being less than the diameter of the detent.

5. In a coupling, the combination of a chambered coupling head closed at the top to provide a housing and having an outwardly opening recess adapted to receive a coacting coupling member, a coupling hook pivotally mounted in said head above said recess and weighted to normally swing to disengaged position, the hook having a tappet at the rear of its bill lying in the recess when the hook is in disengaged position so that the thrust of a coacting coupling member thereon will swing the hook to engaged position, the bill of the hook being substantially vertical when in engaged position, the hook having a curved face with a detent recess therein, a spherical detent, a support for said detent disposed at the rear of said hook and having a forwardly inclined face on which the detent rests, and a pivotally mounted detent keeper at the rear of said detent support having a curved face with a recess therein adapted to receive said detent when the recess is brought into alignment therewith, the distance between said curved detent faces of said hook and keeper in the plane of the detent being less than the diameter of the detent.

6. In a coupling, the combination of a coupling head having an outwardly opening recess adapted to receive a coacting coupling member, a coupling hook pivotally mounted above said recess and weighted to normally swing to disengaged position, the hook having a tappet at the rear of its bill lying in the recess when the hook is in disengaged position so that the thrust of a coacting coupling member thereon will swing the hook to engaged position, the hook having a curved face with a detent recess therein, a detent, a support for said detent disposed at the rear of said hook, and a pivotally mounted detent keeper at the rear of said detent support having a curved face with a recess therein adapted to receive said detent when the recess is brought into alignment therewith.

7. In a coupling, the combination of a coupling head having an outwardly opening recess adapted to receive a coacting coupling member, a coupling hook pivotally mounted above said recess and weighted to normally swing to disengaged position, the hook having a tappet at the rear of its bill lying in the recess when the hook is in disengaged position so that the thrust of a coacting coupling member thereon will swing the hook to engaged position, the hook having a curved face with a detent recess therein, a detent, a support for said detent disposed at the rear of said hook, a pivotally mounted detent keeper at the rear of said detent support having a curved face with a recess therein adapted to receive said detent when the recess is brought into alignment therewith, the pivot of said keeper projecting from the sides of said head, a weight on said keeper pivot acting to hold the keeper in detent locking position, and stops limiting the strokes of said keeper.

8. In a coupling, the combination of a coupling head having an outwardly opening recess adapted to receive a coacting coupling member, a coupling hook pivotally mounted above said recess and weighted to normally swing to disengaged position, the hook having a tappet at the rear of its bill lying in the recess when the hook is in disengaged position so that the thrust of a coacting coupling member thereon will swing the hook to engaged position, the bill of the hook being substantially vertical when in engaged position, the hook having a concentric curved face with a detent recess therein, a detent keeper pivotally mounted at the rear of said hook and having a curved detent face with a recess therein opposed to the detent face of said hook, a detent supported for rolling movement between said hook and detent keeper, the distance between the detent face of said hook and keeper in the plane of the detent being less than the diameter of the detent, the detent keeper being weighted to normally move it to locking position, a stop for positioning said hook when in engaged position in position to receive said detent, and a stop for said detent keeper for positioning said detent keeper in detent receiving position, the hook and the keeper coacting to hold the detent either in engagement with the hook or with the keeper.

9. In a coupling, the combination of a coupling head having an outwardly opening recess adapted to receive a coacting coupling member, a coupling hook pivotally mounted above said recess and weighted to normally swing to disengaged position, the hook having a concentric curved face with a detent recess therein, a detent keeper pivotally mounted at the rear of said hook and having a curved detent face with a recess therein opposed to the detent face of said hook, a detent supported for rolling movement between said hook and detent keeper, the distance between the detent face of said hook and keeper in the plane of the detent being less than the diameter of the detent, the detent keeper being weighted to normally move it to locking position, a stop for positioning said hook when in engaged position in position to receive said detent, and a stop for said detent keeper for positioning said detent keeper in detent receiving position, the hook and the keeper coacting to hold the detent either in engagement with the hook or with the keeper.

10. In a coupling, the combination of a coupling head having an outwardly opening recess adapted to receive a coacting coupling member, a coupling hook pivotally mounted above said recess and weighted to normally swing to disengaged position, the hook having a tappet at the rear of its bill lying in the recess when the hook is in disengaged position so that the thrust of a coacting coupling member thereon will swing the hook to engaged position, the bill of the hook being substantially vertical when in engaged position, the hook having a concentric curved face with a detent recess therein, a detent keeper pivotally mounted at the rear of said hook and having a curved detent face with a recess therein opposed to the detent face of said hook, and a detent supported for rolling movement between said hook and detent keeper, the distance between the detent face of said hook and keeper in the plane of the detent being less than the diameter of the detent, the detent keeper being weighted to normally move it to locking position.

11. In a coupling, the combination of a coupling head having an outwardly opening recess adapted to receive a coacting coupling member, a coupling hook pivotally mounted above said recess and weighted to normally swing to disengaged position, the hook having a concentric curved face with a detent recess therein, a detent keeper pivotally mounted at the rear of said hook and having a curved detent face with a recess therein opposed to the detent face of said hook, and a detent supported for rolling movement between said hook and detent keeper, the distance between the detent face of said hook and keeper in the plane of the detent being less than the diameter of the detent, the detent keeper being weighted to normally move it to locking position.

12. In a coupling, the combination of a head member recessed to rceive a coacting coupling member, a coupling hook pivotally mounted to normally swing to open position and provided with a tappet positioned to be engaged by a coacting coupling member to swing the hook to engaged position, said hook having a detent receiving recess in its rear end, a detent, a detent keeper pivotally mounted at the rear of said hook and detent when its recess is brought into alignment therewith, said detent being supported to hold said hook in engaged position when the detent is in engagement with the hook and to enter the detent recess when it is positioned to receive the same, said detent keeper being provided with a weight acting to actuate the same to locking position and with manual actuating means for shifting to releasing position.

13. In a coupling, the combination of a head member recessed to receive a coacting coupling member, a coupling hook carried by said head member and coacting therewith to lock said coupling member in engaged position of the hook, said hook having a detent receiving recess in its rear end, a detent, and a keeper pivotally mounted at the rear of said hook and recessed to receive said detent when its recess is brought into alignment therewith, said detent being supported for translational movement and adapted to hold said hook in engaged position when the detent is in engagement with the recess of the hook and to enter the detent recess of the keeper when said keeper is positioned to receive the detent.

14. In a coupling, the combination of a head member, a pivoted coupling hook, a translatable detent acting when engaged to hold said coupling hook in coupling position, and a detent keeper operatively associated with said detent to receive the same when in one position and when in another position to retain the detent in engagement with said hook, means supporting said detent for translational movement between said hook and keeper, said hook when in disengaged position acting to hold said detent in engagement with said keeper, said hook being adapted to be actuated to engaged position by the coacting coupling member, said detent being adapted to be manually operated.

15. In a coupling, the combination of a head member, a coupling hook mounted to be actuated to engaged position by the coacting coupling member, a translatable detent acting when engaged to hold said coupling hook in coupling position, a keeper operatively associated with said detent to receive the same when in one position and when in another position to retain the detent in engagement with said hook, said hook when in disengaged position acting to hold said detent in engagement with said keeper, and means supporting said detent for bodily translation between the keeper and hook.

16. In a coupling, the combination of a head member, a coupling hook, a translatable detent acting when engaged to hold said coupling hook in coupling position, a keeper operatively associated with said detent to receive the same when in one position and when in another position to retain the detent in engagement with said hook, said hook when in disengaged position acting to hold said detent in engagement with said keeper, and means supporting said detent for bodily translation between the keeper and hook.

WERNER ZEINDLER.